Feb. 17. 1925. 1,526,466
A. N. EDEBURN
NONSKID CHAIN
Filed Jan. 9, 1922
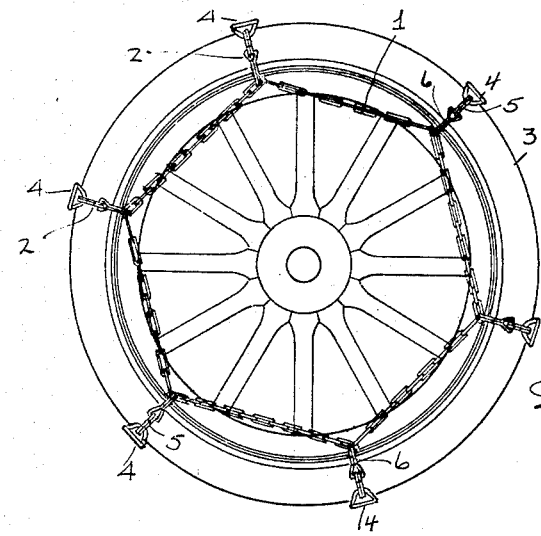
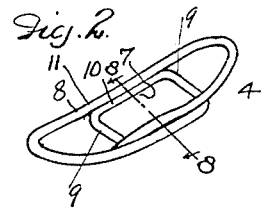
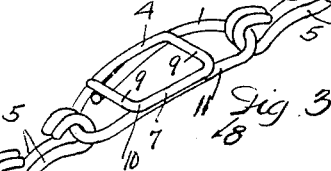
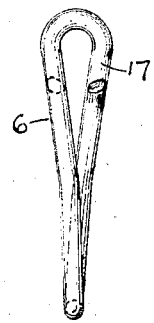
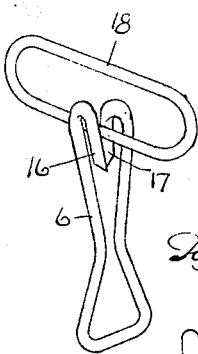
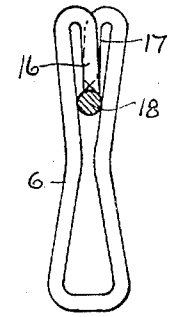
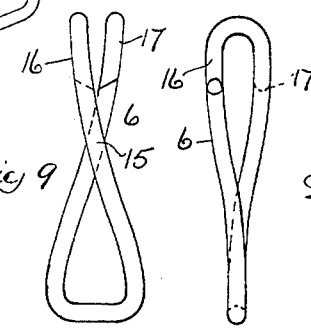
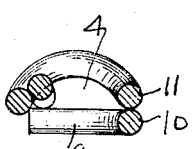
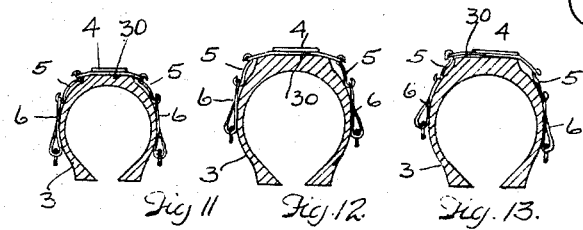
INVENTOR.
Alfred N. Edeburn
BY
Ray, Oberlin & Ray
ATTORNEYS Patented Feb. 17, 1925.

1,526,466

UNITED STATES PATENT OFFICE.

ALFRED N. EDEBURN, OF CLEVELAND, OHIO.

NONSKID CHAIN.

Application filed January 9, 1922. Serial No. 527,940.

*To all whom it may concern:*

Be it known that I, ALFRED N. EDEBURN, a citizen of the United States, and a resident of Cleveland, county of Cuyahoga and State of Ohio, have invented a new and useful Improvement in Nonskid Chains, of which the following is a specification, the principle of the invention being herein explained and the best mode in which I have contemplated applying that principle, so as to distinguish it from other inventions.

The present improvement related as indicated to non-skid chains, is more particularly directed to an improved chain of the so-called "Weed" type, in which a series of short lengths of chain are disposed transversely of the tread portion of the wheel and connected at their ends to circumferentially extending side chains. The particular object of the present invention is the provision of an improved type of tread element for such a chain, together with improved connecting links extending between this tread element and the circumferential side chains. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Fig. 1 is a side elevation of the wheel showing my chains applied thereto; Fig. 2 is a bottom view in perspective of the non-skid element; Fig. 3 is a perspective view of one of the complete cross chains; Figs. 4 and 5 are side and end views respectively, of one of the snap links for connecting the cross chains to the circumferential side chains; Fig. 6 is a view illustrating the method of making the connection between one of the snap links and the link of the side chain; Fig. 7 is a side view of the snap link showing it being connected to the side chain shown in section; Fig. 8 is a section on the line 8—8, Fig. 2; Figs. 9 and 10 are respectively a side elevation and an end view of the modified type of snap link which is preferred to the form shown in Figs. 4 and 5; and Figs. 11, 12 and 13 are sections through tires showing my chain applied thereto.

My improved chain consists of two circumferential side chains 1 between which are connected transverse chains 2. The side chains are not connected to the spokes of the wheel and are therefore free to move circumferentially of the wheel to give the "creeping" action which is desirable with this type of chain, to prevent the wear at any particular points on the tread of the tire 3. Any suitable type of side chains may of course be used.

The cross links are shown in Fig. 3 and consist of a main tread link or non-skid element 4 to which are connected either single or double connecting links 5 and snap links 6, the latter of which snap into the side chains 1. I have shown double connecting links although single ones may be used if desired. The link 4 is constructed to extend substantially across the tread or ground-engaging portion of the tire 3, and this link is varied in length for different sizes of tires. This link is formed from a single length of wire which is formed into an elongated loop, the remaining wire then being coiled into a second loop 7 which is superimposed on the first loop 8 centrally of the same in such a way as to provide two cross elements 9 and double transverse wires 10 and 11. The wires 10 and 11 are welded, brazed or otherwise integrally joined together, and so formed, they afford a double thickness of wire at the point of greatest wear. The two end portions of the main loop are curved slightly away from the plane of the smaller loop 7 in order to conform substantially to the shape of the tire. This allows this main link 4 to lie substantially flat on the tire at all times and to creep around the tire without rolling or turning. The main links are made from ductile wire and after being formed and welded or brazed together in the manner shown, are heat treated or hardened for endurance.

These main or non-skid links 4 are constructed of different lengths to suit different tire sizes as illustrated in Figs. 11 and 12 where this link is shown as extending entirely across the tread portion 30 of the tire. The bent end portions of the main link extend slightly away from the tire sufficiently to allow the connection thereto of the next links now to be described.

The connecting links 5 consist of two strips of wire each of which has its ends bent over to engage the main links 4 and two links instead of a single one are preferably used in order to provide greater flexibility in the cross members of the chain and to better withstand wear. In addition these double links prevent skidding on turns where they come into service because of the slipping of the chain under the tire to some extent.

The preferred form of snap links are shown in Figs. 9 and 10 and consist of a strip of wire 6 bent into a loop with the ends of the wire crossed at the point 15, after which each end is rebent upon itself. These ends are bent in opposite directions to form hooks 16 and 17. The links 6 are snapped into the side chains 1 in the manner indicated in Fig. 6, the links 18 of the side chain being inserted between the two rebent hook portions 16 and 17 of the links and then twisted to engage it beneath the two hooked ends of the snap link 6. The link 18 is prevented from accidental disengagement by the form of the snap link 6 and by the fact that the point where the two hooks of this link cross the spacing between the wires, is too small to pass the link 18 therebetween so that the links 18 are kept in the hook ends of the snap links.

The links shown in Figs. 4 and 5 are similar to the links of Figs. 9 and 10 except that the hook ends are not crossed, but there is the same tendency in these links to maintain the side links 18 in the hook-end portions of the snap links.

In Figure 13 I have shown the position taken by the cross chain, and particularly, the position of the main link and connecting or intermediate links 5 when the vehicle is turning a corner. Under such conditions, the cross chains slip slightly in the direction of the turn, that is, they slip across the tire slightly, the effect on the present chain being to tilt the main link 4 and allow one of the curved end portions of this link to be pressed down flat against the side wall of the tire. This also brings into play the connecting links 5 which then assist in providing a gripping action on the road.

The present chain provides a very much improved tread member which is maintained in closer contact with the tire and it is provided with a considerably increased capacity for wear over the old type of links used in the so-called "Weed" chains, while the remainder of the cross chains are designed to facilitate attachment and replacement of the side chains for repair or replacement. Also the links next to the main link are designed to prevent skidding in turning corners where this portion of the chain comes into play.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A non-skid element comprising an elongated wire loop and a second shorter loop superimposed upon said first named loop and integrally joined thereto, said two loops being formed of a single length of hardened wire.

2. A non-skid element comprising an elongated wire loop having its end portions inclined slightly from the plane of the central portion of said loop, and a second smaller loop superimposed upon the central portion of said first named loop and integrally joined thereto.

3. A non-skid element comprising an elongated wire loop having its end portions inclined slightly from the plane of the central portion of said loop, and a second smaller loop superimposed upon the central portion of said first named loop, and said two loops being formed from a single length of hardened wire and being integrally joined to each other.

Signed by me this 31st day of December, 1921.

ALFRED N. EDEBURN.